(12) United States Patent
Uehara

(10) Patent No.: US 12,313,128 B2
(45) Date of Patent: May 27, 2025

(54) POWER TRANSMISSION DEVICE

(71) Applicant: EXEDY Corporation, Neyagawa (JP)

(72) Inventor: Hiroshi Uehara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 460 days.

(21) Appl. No.: 17/831,672

(22) Filed: Jun. 3, 2022

(65) Prior Publication Data

US 2023/0003260 A1     Jan. 5, 2023

(30) Foreign Application Priority Data

Jul. 5, 2021   (JP) ................................ 2021-111488

(51) Int. Cl.
    *F16D 3/12*      (2006.01)
    *F16F 15/134*      (2006.01)
    *F16D 7/02*      (2006.01)

(52) U.S. Cl.
    CPC .......... *F16D 3/12* (2013.01); *F16F 15/13469* (2013.01); *F16D 7/025* (2013.01); *F16F 2222/08* (2013.01); *F16F 2232/02* (2013.01); *F16F 2236/08* (2013.01)

(58) Field of Classification Search
    CPC ...... F16D 3/12; F16D 7/025; F16F 15/13469; F16F 2222/08; F16F 2232/02; F16F 2236/08
    USPC .................................................. 464/46, 68.1
    See application file for complete search history.

(56) References Cited

U.S. PATENT DOCUMENTS

| | | | |
|---|---|---|---|
| 1,612,341 A * | 12/1926 | Alben | F16D 3/66 464/66.1 |
| 9,416,845 B2 * | 8/2016 | Usui | F16D 7/025 |
| 10,995,817 B2 * | 5/2021 | Yamazumi | F16F 15/1203 |

FOREIGN PATENT DOCUMENTS

| | | |
|---|---|---|
| JP | 2009281487 A | 12/2009 |
| JP | 2015001234 A | 1/2015 |
| JP | 2019-019918 A | 2/2019 |

* cited by examiner

*Primary Examiner* — Greg Binda
(74) *Attorney, Agent, or Firm* — United IP Counselors, LLC

(57) ABSTRACT

A power transmission device includes an inertia ring, a plate, a plurality of first bolts, a torque transmission member, and a plurality of second bolts. The inertia ring has an annular shape. The inertia ring includes a plurality of through holes. The plurality of through holes are disposed at intervals in a circumferential direction. The plate is disposed on a first side with respect to the inertia ring in an axial direction. The plurality of first bolts are screwed into the plurality of through holes from the first side to fasten the plate to the inertia ring. The torque transmission member is disposed on a second side with respect to the inertia ring in the axial direction. The plurality of second bolts are screwed into the plurality of through holes from the second side to fasten the torque transmission member to the inertia ring.

4 Claims, 7 Drawing Sheets

FIRST SIDE ← AXIAL DIRECTION → SECOND SIDE

POWER TRANSMISSION DEVICE

CROSS-REFERENCE TO RELATED APPLICATIONS

This application claims priority to Japanese Patent Application No. 2021-111488 filed Jul. 5, 2021. The entire contents of that application are incorporated by reference herein in their entirety.

TECHNICAL FIELD

The present invention relates to a power transmission device.

BACKGROUND ART

There has been known a type of power transmission device that a torque transmission device such as a damper device is attached to a flexible flywheel (see Japan Laid-open Patent Application Publication No. 2019-19918). The flexible flywheel is formed by attaching an inertia ring to an outer peripheral part of an elastic plate. Besides, the damper device is attached to the inertia ring.

Cost reduction has been demanded for the power transmission device configured as described above. In view of this, it is an object of the present invention to provide a power transmission device obtainable at low cost.

BRIEF SUMMARY

A power transmission device according to an aspect of the present invention includes an inertia ring, a plate, a plurality of first bolts, a torque transmission member, and a plurality of second bolts. The inertia ring has an annular shape. The inertia ring includes a plurality of through holes. The plurality of through holes are disposed at intervals in a circumferential direction. The plate is disposed on a first side with respect to the inertia ring in an axial direction. The plurality of first bolts are screwed into the plurality of through holes from the first side to fasten the plate to the inertia ring. The torque transmission member is disposed on a second side with respect to the inertia ring in the axial direction. The torque transmission member is a member to which a torque is transmitted from the inertia ring. The plurality of second bolts are screwed into the plurality of through holes from the second side to fasten the torque transmission member to the inertia ring.

According to this configuration, the first bolts for fastening the plate to the inertia ring and the second bolts for fastening the torque transmission member to the inertia ring are screwed in common into the through holes. Thus, the through holes are used in common between the first bolts and the second bolts, whereby manufacturing cost can be reduced. In other words, the power transmission device can be obtained at low cost.

Preferably, the power transmission device further includes a knock pin. The knock pin is a member for positioning the torque transmission member with respect to the inertia ring. The plurality of through holes include a first through hole and a second through hole. The first through hole includes a female threaded portion provided on an entirety thereof in the axial direction. The second through hole includes a first hole portion and a second hole portion. The first hole portion is disposed on the first side in the axial direction and includes a female threaded portion. The second hole portion is disposed on the second side in the axial direction and does not include a female threaded portion. Each of the plurality of first bolts is screwed into either the first through hole or the first hole portion of the second through hole. Each of the plurality of second bolts is screwed into the first through hole. The knock pin is inserted into the second hole portion of the second through hole.

Preferably, the power transmission device further includes a knock pin. The knock pin is a member for positioning the torque transmission member with respect to the inertia ring. The inertia ring includes a plurality of recesses into each of which the knock pin is inserted.

Preferably, the plate includes a plurality of third through holes disposed on a circumference of a common imaginary circle. The torque transmission member includes a plurality of fifth through holes disposed on a circumference of a common imaginary circle. The plurality of first bolts are screwed into the plurality of through holes through the plurality of third through holes. The plurality of second bolts are screwed into the plurality of through holes through the plurality of fifth through holes. The plurality of third through holes have an equal PCD (pitch circle diameter) to the plurality of fifth through holes.

Preferably, the torque transmission member is a damper device attenuating fluctuations in rotation transmitted thereto from the inertia ring.

Overall, according to the present invention, the power transmission device can be obtained at low cost.

DETAILED DESCRIPTION

A power transmission device according to the present preferred embodiment will be hereinafter explained with reference to drawings. It should be noted that in the following explanation, the term "axial direction" refers to an extending direction of a rotational axis O of the power transmission device. On the other hand, the term "circumferential direction" refers to a circumferential direction of an imaginary circle about the rotational axis O, whereas the term "radial direction" refers to a radial direction of the imaginary circle about the rotational axis O. Besides, in the present preferred embodiment, the term "first side in the axial direction" means the left side in FIGS. 1 and 2, whereas the term "second side in the axial direction" means the right side in FIGS. 1 and 2.

Figure 1:
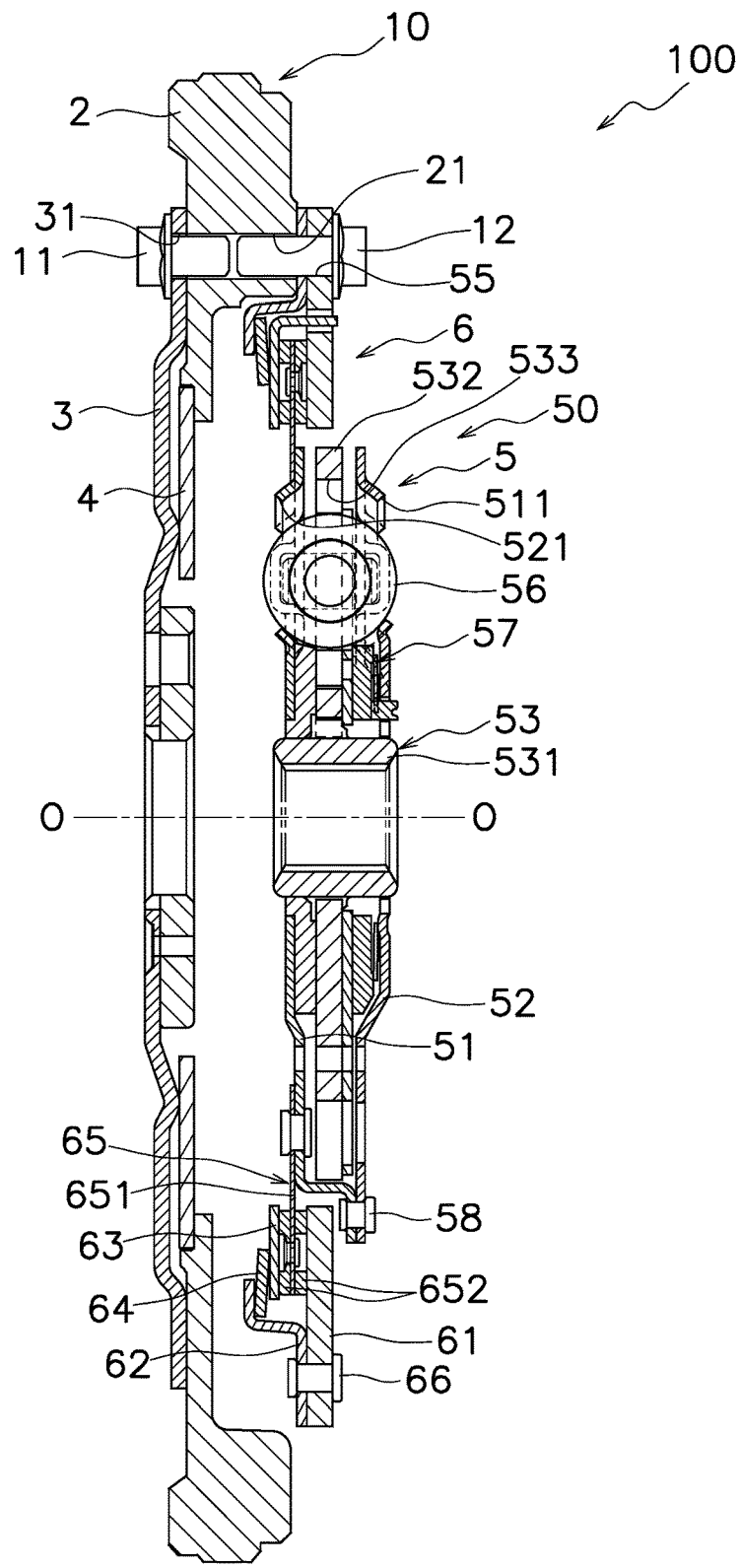
FIG. 1 is a cross-sectional view of a power transmission device shown for indicating first through holes.
Figure 2:
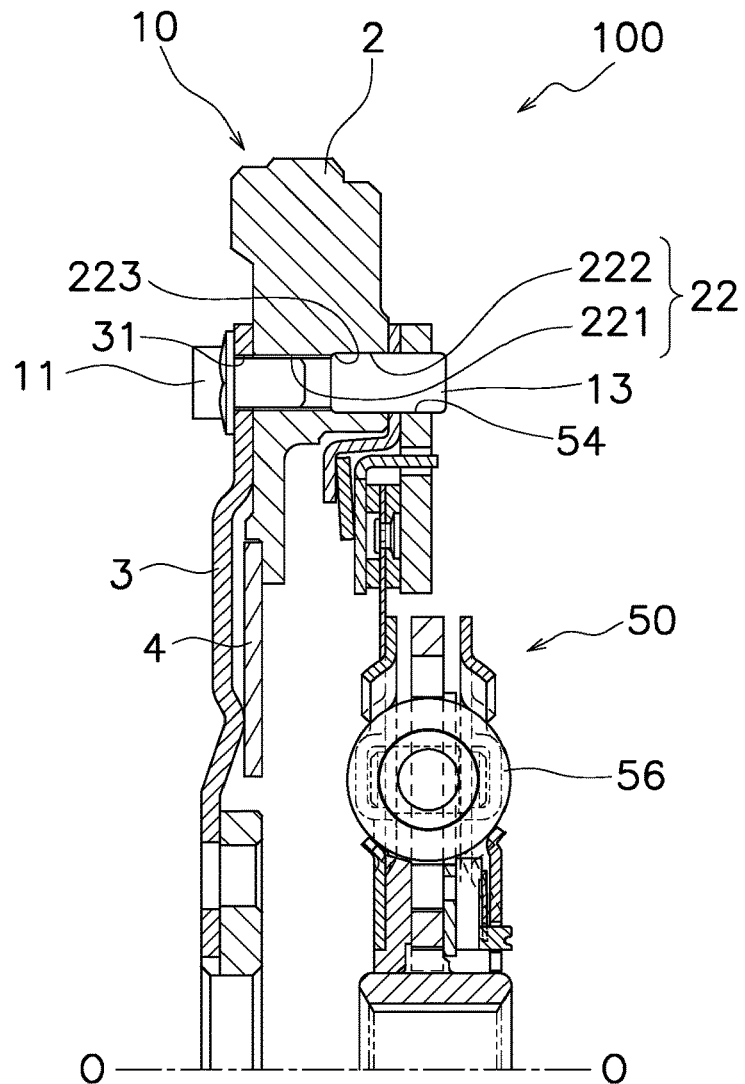
FIG. 2 is a cross-sectional view of the power transmission device, taken at a different angular location than FIG. 1, shown for indicating second through holes.

As shown in FIGS. 1 and 2, a power transmission device 100 includes a flexible flywheel 10, a damper device 50 (exemplary torque transmission member), a plurality of first bolts 11, a plurality of second bolts 12, and a plurality of knock pins 13. The power transmission device 100 is disposed in, for instance, a power transmission path from a drive source (an engine, an electric motor, or so forth) to a drive wheel or wheels. For example, the drive source is disposed on the first side with respect to the power transmission device 100 in the axial direction, whereas a transmission and/or so forth are disposed on the second side with respect to the power transmission device 100 in the axial direction.

The power transmission device 100 is attached to first and second transmission shafts (not shown in the drawings) so as to transmit power inputted thereto from the first transmission shaft to the second transmission shaft. The first transmission shaft is provided as a drive source-side component, whereas a second transmission shaft is provided as a drive wheel-side component. The first and second transmission shafts are disposed coaxial to each other. The first transmission shaft is, for instance, a crankshaft. The second transmission shaft is, for instance, an input shaft of the transmission. The flexible flywheel 10 is attached to the first transmission shaft, whereas the damper device 50 is attached to the second transmission shaft.

[Flexible Flywheel]

The flexible flywheel 10 includes an inertia ring 2 and a flexible plate 3 (exemplary plate). Besides, the flexible flywheel 10 includes a disc spring 4.

The inertia ring 2 has an annular shape. The inertia ring 2 includes a plurality of first through holes 21 and a plurality of second through holes 22. The respective first through holes 21 axially penetrate the inertia ring 2, and likewise, the respective second through holes 22 axially penetrate the inertia ring 2.

Figure 3:
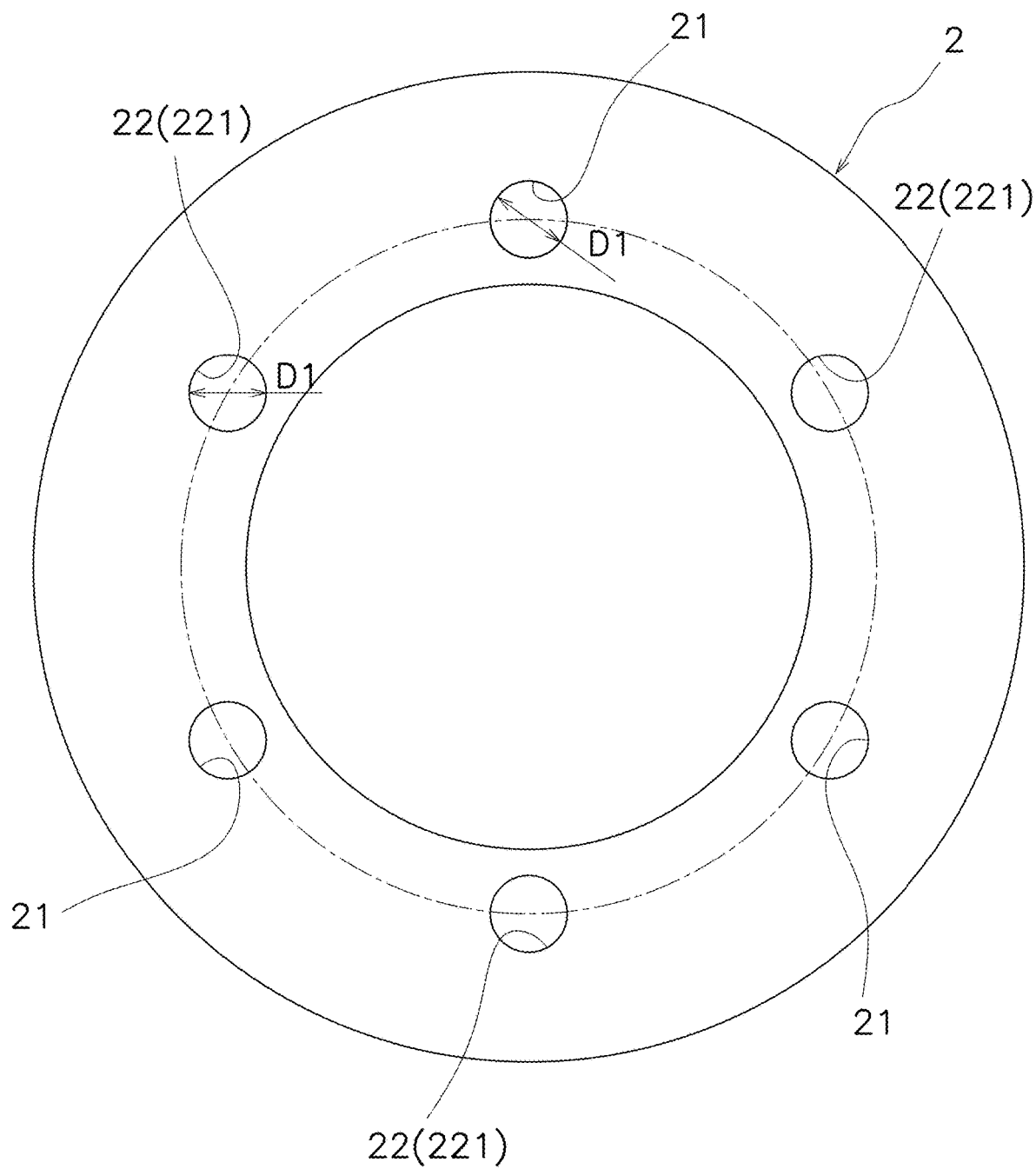
FIGS. 3 and 4 are schematic illustrations of an inertia ring from first and second sides, respectively, for indicating spacing and relative diameters of the first and second through holes.
Figure 4:
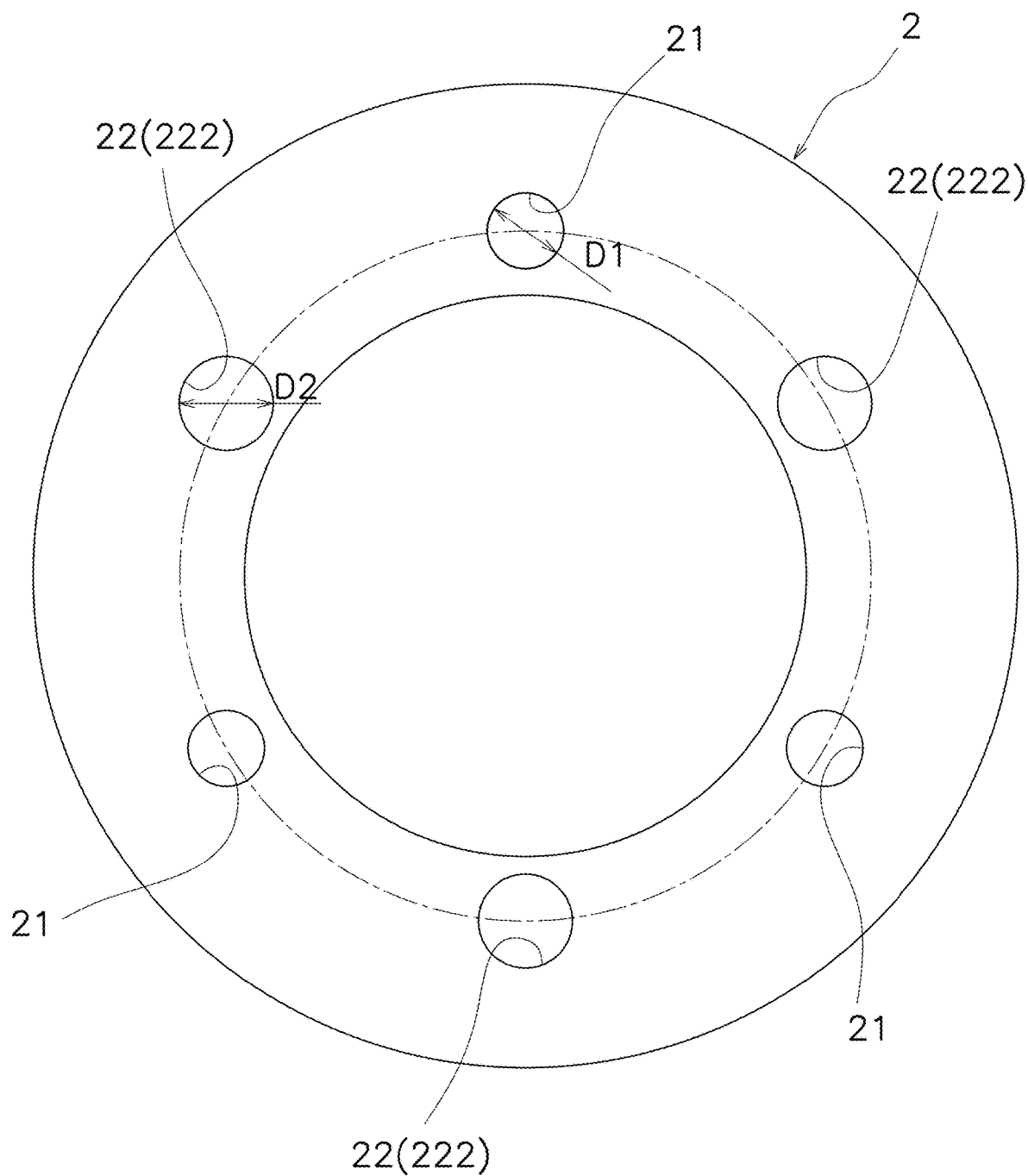

The first through holes 21 and the second through holes 22 are disposed on the circumference of a common imaginary circle, as illustrated schematically in FIGS. 3 and 4. In other words, the first through holes 21 have a PCD (Pitch Circle Diameter) equal to that of the second through holes 22. The first through holes 21 and the second through holes 22 are disposed apart from each other at intervals in the circumferential direction.

As shown in FIG. 1, each first through hole 21 extends in the axial direction. Each first through hole 21 opens not only to the first side in the axial direction but also to the second side in the axial direction. Each first through hole 21 includes a female threaded portion provided on the entirety thereof in the axial direction. In other words, each first through hole 21 is made in form of a screw hole entirely in the axial direction.

As shown in FIG. 2, each second through hole 22 extends in the axial direction. Each second through hole 22 opens not only to the first side in the axial direction but also to the second side in the axial direction. Each second through hole 22 includes a first hole portion 221 and a second hole portion 222.

The first hole portion 221 composes part of each second through hole 22 and is disposed on the first side in the axial direction. The first hole portion 221 includes a female threaded portion. In other words, the first hole portion 221 is made in form of a screw hole.

The second hole portion 222 composes part of each second through hole 22 and is disposed on the second side in the axial direction. The second hole portion 222 is greater in diameter (D2) than the first hole portion 221 (D1). Because of this, a step portion 223 is formed between the second hole portion 222 and the first hole portion 221. It should be noted that the second hole portion 222 is disposed coaxial to the first hole portion 221.

The second hole portion 222 does not include any female threaded portion. In other words, the second hole portion 222 is not made in form of a screw hole.

As shown in FIGS. 1 and 2, the flexible plate 3 is disposed on the first side with respect to the inertia ring 2 in the axial direction. The flexible plate 3 has a disc shape and includes an opening in the middle thereof. The flexible plate 3 is less in outer diameter than the inertia ring 2.

The flexible plate 3 receives the first transmission shaft fixed to the inner peripheral part thereof. The flexible plate 3 receives the power transmitted thereto from the drive source such as the engine or the electric motor through the first transmission shaft. The flexible plate 3 is elastically deformable. Because of this, the flexible plate 3 can absorb vibrations transmitted thereto from the first transmission shaft.

The flexible plate 3 is attached at the outer peripheral part to the inertia ring 2. The flexible plate 3 is attached to the inertia ring 2 by the plural first bolts 11.

Figure 5:
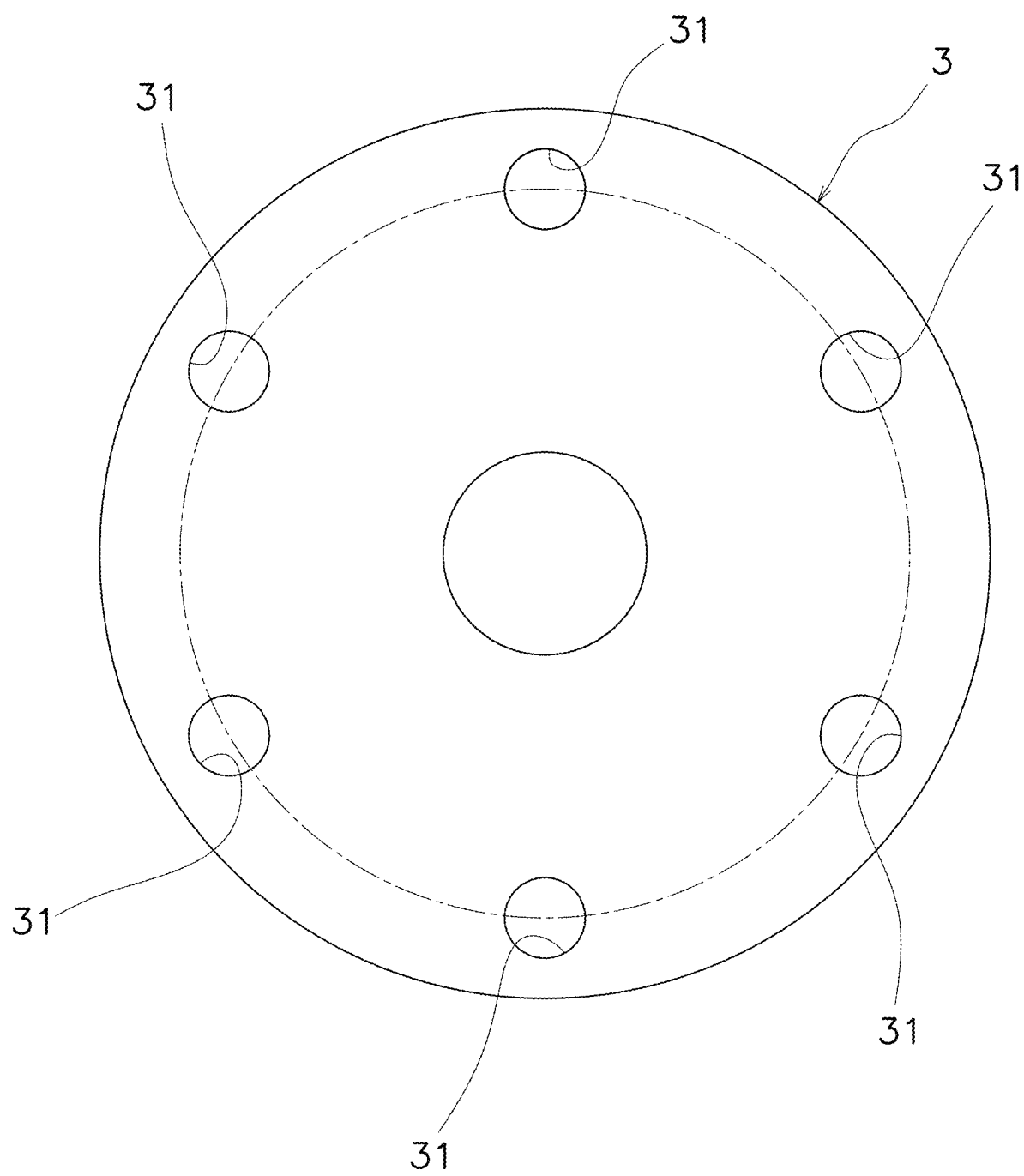
FIG. 5 is a schematic illustration of a flexible plate for indicating spacing of third through holes.

When described in detail, the flexible plate 3 includes a plurality of third through holes 31. The third through holes 31 are disposed apart from each other at intervals on the circumference of a common imaginary circle, as illustrated schematically in FIG. 5. The third through holes 31 have a PCD equal to that of the first through holes 21.

Each first bolt 11 penetrates each third through hole 31 from the first side in the axial direction and is screwed into each first or second through hole 21, 22. Accordingly, the first bolts 11 fasten the flexible plate 3 to the inertia ring 2.

The disc spring 4 is disposed axially between the inertia ring 2 and the flexible plate 3. The disc spring 4 makes contact at the outer peripheral end thereof with the inner peripheral end of the inertia ring 2. The disc spring 4 makes contact at the inner peripheral end thereof with the flexible plate 3.

[Damper Device]

The damper device 50 is disposed on the second side with respect to the inertia ring 2 in the axial direction. The damper device 50 is attached at the outer peripheral part thereof to the inertia ring 2. The damper device 50 is attached to the inertia ring 2 by the plural second bolts 12. The damper device 50 is configured to receive a torque transmitted thereto from the inertia ring 2.

Figure 6:
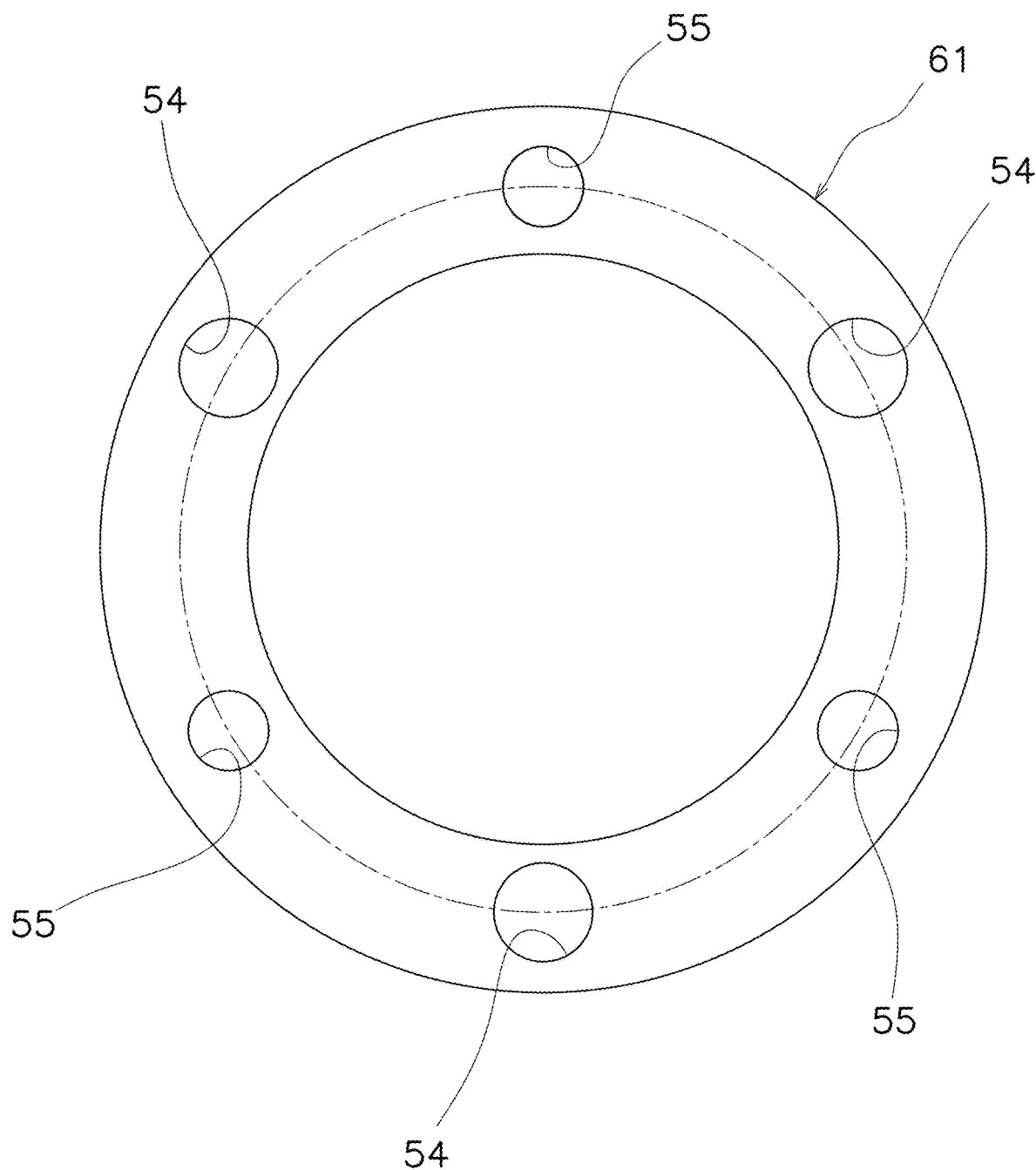
FIG. 6 is a schematic illustration of a first torque-limiter side plate for indicating spacing of fourth and fifth through holes.

When described in detail, the damper device 50 includes a plurality of fourth through holes 54 and a plurality of fifth through holes 55, as illustrated schematically in FIG. 6. The fourth through holes 54 are disposed apart from each other at intervals on the circumference of a common imaginary circle. The fourth through holes 54 have a PCD equal to that of the second through holes 22. In other words, the PCD of the fourth through holes 54 is equal to that of the third through holes 31.

As shown in FIG. 2, each knock pin 13 is fitted to each fourth through hole 54, while being fitted to the second hole portion 222 of each second through hole 22. Thus, each knock pin 13 is fitted to each fourth through hole 54 and each second through hole 22, whereby circumferential positioning of the damper device 50 is made. It should be noted that the step portion 223 restricts each knock pin 13 from intruding into the first hole portion 221.

As shown in FIGS. 1 and 6, the fifth through holes 55 are disposed apart from each other at intervals on the circumference of a common imaginary circle. The fifth through holes 55 are disposed on the circumference of the imaginary circle on which the fourth through holes 54 are disposed. The fifth through holes 55 have a PCD equal to that of the first through holes 21. In other words, the PCD of the fifth through holes 55 is equal to that of the third through holes 31.

Each second bolt 12 is screwed into each first through hole 21, while penetrating each fifth through hole 55 from the second side in the axial direction. Accordingly, the second bolts 12 fasten the damper device 50 to the inertia ring 2. It should be noted that the distal end of each first bolt 11 and that of each second bolt 12 are not in contact with each other. In other words, each first bolt 11 and each second bolt 12 are disposed apart from each other at an interval in the axial direction.

As described above, when the damper device 50 is attached to the inertia ring 2, all the plural second bolts 12 are screwed into the first through hole 21, respectively, without being screwed into the second through holes 22. The second bolts 12 are not screwed into the second through holes 22, respectively; instead, the knock pins 13 are fitted thereto, respectively. On the other hand, when the flexible plate 3 is attached to the inertia ring 2, some of the plural first bolts 11 are screwed into the first through holes 21, whereas the remaining thereof are screwed into the second through holes 22. The sum of the number of the second bolts 12 and that of the knock pins 13 is equal to the number of the first bolts 11. In other words, the first bolts 11 are greater in number than the second bolts 12.

The damper device 50 includes a damper unit 5 and a torque limiter unit 6.

The damper unit 5 includes a first input plate 51, a second input plate 52, a hub flange 53, and a plurality of elastic members 56. Besides, the damper unit 5 includes a hysteresis generating mechanism 57. The damper unit 5 is configured to attenuate rotational fluctuations.

The first and second input plates 51 and 52 are fixed to each other by at least one rivet 58 and are thereby unitarily rotated. Each of the first and second input plates 51 and 52 includes at least one window portion 511, 521. The window portions 511 and 521 support the elastic members 56.

The hub flange 53 is configured to transmit a torque, inputted thereto from the first and second input plates 51 and 52, to an output-side device. The hub flange 53 includes a hub 531 and a flange plate 532. The hub 531 and the flange plate 532 are integrated by a plurality of teeth and a plurality of recesses with which the teeth are meshed.

The hub 531 is a tubular member provided with a spline hole. The spline hole enables the second transmission shaft to be spline-coupled thereto.

The flange plate 532 is disposed axially between the first and second input plates 51 and 52. The flange plate 532 includes at least one accommodation hole 533. The at least one accommodation hole 533 accommodates the elastic members 56.

The elastic members 56 are configured to elastically couple the first and second input plates 51 and 52 and the flange plate 532 in a rotational direction. The elastic members 56 are, for instance, coil springs.

[Torque Limiter Unit]

The torque limiter unit 6 is disposed radially outside the damper unit 5. The torque limiter unit 6 is configured to limit a torque transmitted between the flexible flywheel 10 and the damper unit 5.

The torque limiter unit 6 includes a first side plate 61, a second side plate 62, a pressure plate 63, a cone spring 64, and a friction disc 65.

Each of the first and second side plates 61 and 62 has an annular shape. The first and second side plates 61 and 62 are fixed to each other by at least one rivet 66 or so forth. Because of this, the first and second side plates 61 and 62 are unitarily rotated with each other. Each of the first and second side plates 61 and 62 is provided with the plural fourth through holes 54 and the plural fifth through holes 55 in the outer peripheral part thereof, as illustrated schematically for the first side plate 61 in FIG. 6.

The pressure plate 63 has an annular shape. The pressure plate 63 is disposed axially between the first and second side plates 61 and 62. The cone spring 64 is disposed axially between the second side plate 62 and the pressure plate 63. The cone spring 64 urges the pressure plate 63 toward the first side plate 61.

The friction disc 65 includes a core plate 651 and a pair of friction members 652. The friction disc 65 is attached at the inner peripheral end thereof to the first input plate 51. The cone spring 64 presses the friction disc 65 through the pressure plate 63 against the first side plate 61.

When a torque having a predetermined value or greater is inputted to the first side plate 61 from the inertia ring 2, the friction disc 65 slides against the first side plate 61, whereby the friction disc 65 and the first side plate 61 are rotated relative to each other.

MODIFICATIONS

One preferred embodiment of the present invention has been explained above. However, the present invention is not limited to the above, and a variety of changes can be made without departing from the gist of the present invention.

Modification 1

In the preferred embodiment described above, the inertia ring 2 is provided with two types of through holes, i.e., the first through holes 21 and the second through holes 22. However, the configuration of the inertia ring 2 is not limited to this. For example, the inertia ring 2 may be provided with only the first through holes 21 without being provided with the second through holes 22.

Figure 7:
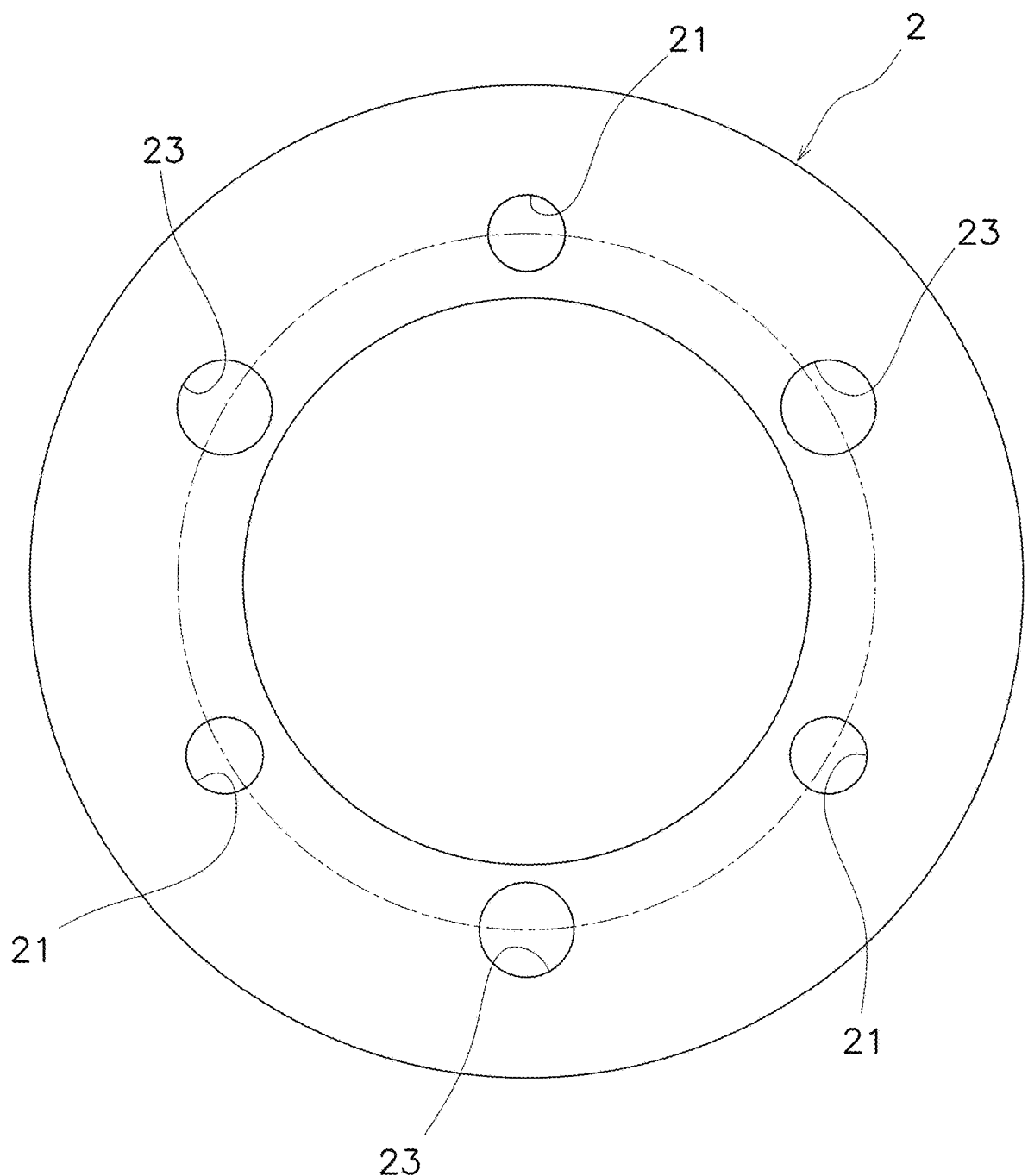
FIG. 7 is a schematic illustration of the inertia ring from the second side according to a first modification.

In this case, the first bolts 11 can be made equal in number to the second bolts 12. Besides, the inertia ring 2 may be provided with a plurality of recesses 23 for the knock pins 13, as illustrated schematically in FIG. 7. The recesses for the knock pins 13 may have a PCD equal or unequal to that of the first through holes 21.

Modification 2

In the preferred embodiment described above, the damper device 50 includes the torque limiter unit 6. However, the damper device 50 may not include the torque limiter unit 6. In this case, at least either of the first and second input plates 51 and 52 in the damper unit 5 is provided with the fourth and fifth through holes 54 and 55 in the outer peripheral part thereof. Besides, at least either of the first and second input plates 51 and 52 is fastened to the inertia ring 2 by the second bolts 12.

REFERENCE SIGNS LIST

2: Inertia ring
21: First through hole
22: Second through hole
221: First hole portion
222: Second hole portion
3: Flexible plate
31: Third through hole 11: First bolt
12: Second bolt
13: Knock pin
50: Damper device
55: Fifth through hole
100: Power transmission device

What is claimed is:

1. A power transmission device, comprising:
an inertia ring having an annular shape, the inertia ring including a plurality of through holes extending through the inertia ring and disposed at intervals in a circumferential direction;
a plate disposed on a first side with respect to the inertia ring in an axial direction;
a plurality of first bolts screwed into the plurality of through holes from the first side to fasten the plate to the inertia ring;
a torque transmission member to which a torque is transmitted from the inertia ring, the torque transmission member disposed on a second side with respect to the inertia ring in the axial direction;
a plurality of second bolts screwed into the plurality of through holes from the second side to fasten the torque transmission member to the inertia ring, with each of the second bolts being screwed into a through hole into which one of the first bolts is screwed from the first side; and
a knock pin configured to position the torque transmission member with respect to the inertia ring, wherein
the plurality of through holes include first and second through holes,
each first through hole includes a female threaded portion provided on an entirety thereof in the axial direction,
each second through hole includes a first hole portion and a second hole portion, the first hole portion disposed on the first side in the axial direction, the first hole portion including a female threaded portion, the second hole portion disposed on the second side in the axial direction, the second hole portion including no female threaded portion,
each first bolt is screwed into either one of the first through holes from the first side or the first hole portion of one of the second through holes from the first side,
each second bolt is screwed into one of the first through holes from the second side, and
the knock pin is inserted into the second hole portion of one of the second through holes from the second side, with one of the first bolts being screwed into the first hole portion of the same second through hole from the first side.

2. The power transmission device according to claim 1, wherein
the plate includes a plurality of third through holes disposed on a circumference of a common imaginary circle,
the torque transmission member includes a plurality of fifth through holes disposed on a circumference of a common imaginary circle,
the plurality of first bolts are screwed into the plurality of through holes through the plurality of third through holes,
the plurality of second bolts are screwed into the plurality of through holes through the plurality of fifth through holes, and
the plurality of third through holes have an equal pitch circle diameter to the plurality of fifth through holes.

3. The power transmission device according to claim 1, wherein the torque transmission member is a damper device configured to attenuate fluctuations in rotation transmitted thereto from the inertia ring.

4. A power transmission device, comprising:
an inertia ring having an annular shape, the inertia ring including a plurality of through holes extending through the inertia ring and disposed at intervals in a circumferential direction;
a plate disposed on a first side with respect to the inertia ring in an axial direction;
a plurality of first bolts screwed into the plurality of through holes from the first side to fasten the plate to the inertia ring;
a torque transmission member to which a torque is transmitted from the inertia ring, the torque transmission member disposed on a second side with respect to the inertia ring in the axial direction;
a plurality of second bolts screwed into the plurality of through holes from the second side to fasten the torque transmission member to the inertia ring, with each of the second bolts being screwed into a through hole into which one of the first bolts is screwed from the first side; and
a plurality of knock pins configured to position the torque transmission member with respect to the inertia ring, wherein
the inertia ring includes a plurality of recesses into each of which one of the knock pins is inserted.

* * * * *